United States Patent [19]

Vad et al.

[11] 3,954,436

[45] May 4, 1976

[54] REACTIVE TENSIDE SOIL CONDITIONERS

[75] Inventors: János Vad; Béla Bartha, both of Budapest; Miklós Nádasy, Veszprem; Ottó Dobozy; Ferenc Maté, both of Budapest; Miklós Kovács; Márton Kölcsei, both of Veszprem; Éva Karácsonyi, nee Spindler, Budapest, all of Hungary

[73] Assignee: Novex Rt., Budapest, Hungary

[22] Filed: Dec. 7, 1973

[21] Appl. No.: 422,891

[30] Foreign Application Priority Data

Dec. 7, 1972 Hungary............................ EE 2075

[52] U.S. Cl........................................ 71/27; 71/28; 71/63; 71/64 SC; 260/69 N

[51] Int. Cl.$^2$..................... C05C 13/00; C05C 9/02; C08G 12/12

[58] Field of Search................. 71/1, 21, 27, 28, 30, 71/31, 55, 64 SC; 260/69, 70, 72 R

[56] References Cited

UNITED STATES PATENTS

| | | | |
|---|---|---|---|
| 3,384,622 | 5/1968 | Sheers | 260/72 R |
| 3,491,064 | 1/1970 | Enders | 260/72 R |
| 3,759,687 | 9/1973 | Nobell | 71/28 |

OTHER PUBLICATIONS

Fertilizer Technology and Use, 2nd Ed., 1971, pp. 230–232, 461–469.

*Primary Examiner*—Frank A. Spear, Jr.
*Assistant Examiner*—Ferris H. Lander

[57] ABSTRACT

Soil conditioning compositions in which the active component is a reactive tenside being (a) condensation products, having a molecular weight under 15,000, of one or more of (i) ethylenediamine, diethylenetriamine, propylenediamine, dipropylenediamine, guanidine, dicyandiamide, N-aminoethyl alkylamines, N-aminoethyl alkyleneamines, N-aminoethyl alkyldienamines, N-aminopropyl alkylamines, N-aminopropyl alkyleneamines, N-aminopropyl alk-dienylamines, imidazoline, imidazole, 1-aminoethyl-imidazoline, 1-aminoethyl-2-alkyl-2-imidazoline, and 1-aminoethyl-2-alkyl-2-imidazoline, and 1-aminoethyl-2-alkylene-2-imidazoline, with one or more of (ii) formaldehyde, acetaldehyde, propionaldehyde, $C_{2-6}$ dihalogenealkanes; (b) alkyl- or alkylcarboxyamide end group-containing derivatives of reactions between the components of (a) which are partially or totally alkylated with $C_{1-2}$ chain compounds having a molecular weight under 15,000, and (c) water-soluble condensation products of urea with formaldehyde, acetaldehyde, propionaldehyde, or dihalogenealkanes, and (d) acid addition salts of (a), (b), and (c). Process for using these reactive tenside-containing compositions involve applying the compositions to the soil.

2 Claims, No Drawings

REACTIVE TENSIDE SOIL CONDITIONERS

The present invention relates to compositions and processes for the promotion of crop growth and crop yields by the addition of soil-treating compositions to the soil in which such crops are grown.

In accordance with the present invention it was discovered that the adding of reactive tensides to soil and of compositions containing certain reactive tensides results in an improvement of crop growth and/or yield.

Reactive tensides became known only relatively recently as surfactants useful in the washing of fatty wool. Such materials are described, for instance, in the Jnal. Oil Colour Chem. Assoc., Vol. 54, 1971, pp.342–350. Similar materials were disclosed by H. Merz in Zurich in 1972 on the Sixth International Congress on Surface Active Agents.

In accordance with the present invention reactive tensides which decrease the surface tension at the soil-water interface have a cationic or potentially cationic character and contain reactive groups by the aid of which they can be converted into crosslinked, insoluble products due to acid conditions and/or elevated temperatures. The compound is potentially of cationic character, in that acid addition results in a product having a cationic group.

The reactive tensides contained in the compositions of the present invention are (a) condensation products, having a molecular weight under 15,000, of one or more of (i) ethylenediamine, diethylenetriamine, propylenediamine, dipropylenediamine, guanidine, dicyandiamide, N-aminoethyl alkylamines, N-aminoethyl alkyleneamines, N-aminoethyl alkyldienamines, N-aminopropyl alkylamines, N-aminopropyl alkyleneamines, N-aminopropyl alk-dien-ylamines imidazoline, imidazole, 1-aminoethyl-imidazoline, 1-aminoethyl-2-alkyl-2-imidazoline, and 1-aminoethyl-2-alkylene-2-imidazoline, with one or more of (ii) formaldehyde, acetaldehyde, propionaldehyde, and $C_{2-6}$ dihalogenealkanes; (b) alkyl-or alkylcarboxyamide end group-containing derivatives of reactions between the components of (a) which are partially or totally alkylated with $C_{1-2}$ chain compounds having a molecular weight under 15,000, and (c) water-soluble condensation products of urea with formaldehyde, acetaldehyde, propionaldehyde, or dihalogenealkanes, and (d) acid addition salts of (a), (b), and (c). The acid addition salts are suitably prepared by the use of hydrochloric-, hydroiodic-, or acetic acid.

The process of the present invention involves applying the compositions of the present invention to soil, such as by spraying, or spreading, suitably on a solid carrier.

The preparation of reactive tensides, such as those which are employed in accordance with the present invention, is described, for instance, in K. Lindner: Tenside, Textilhilfsmittel, Waschrohstoffe, Wissenschaftliche Verlagsgesellschaft, Stuttgart, 1964, pp. 1058–1060. There are otherwise well known methods available for their production.

The soil treating compositions of the present invention contain, in addition to their active ingredients, a chemically compatible carrier or solvent. The term "chemically compatible" as used in the specification and claims is intended to mean that the carrier, solvent, diluent, etc. is chemically inert with respect to the active component or components and is not harmful to the vegetation.

In addition to the active ingredient and the carrier or solvent, the soil treating compositions of the present invention can suitably contain other materials that are customarily employed in the growing of useful crops. These can include fertilizers, trace elements, herbicides, germicides, insecticides, soil disinfectants, hormone-active agents, flocculants and customarily employed soil conditioners. Such additives can suitably include alginates or alginate derivatives, cellulose and/or starch derivatives such as carboxymethylcellulose. Cellulose ether derivatives, starch ether derivatives as well as ester derivatives of such compounds, hydrolysed polyacrylonitrile, polyacrylic acid or salts thereof, polyacrylamide, acrylamideacrylic acid copolymers or their salts or esters, polyvinyl acetate, vinyl acetate-maleic acid anhydride copolymers, polyvinylalcohol, linear urea-formaldehyde resins, sulfonated resins, polymethacrylic acid or their slats, esters, polyvinylpyrrolidone, etc.

Suitable carriers and diluents include chemically compatible materials of mineral character, such as diatomaceous earth, quartz powder, bentonite, kaolinite; powders of natural organic origin, such as peat, humus, ground fruit pits, fish scale meal, bone meal; also synthetic inorganic substances such as powdered limestone, chalk powder, activated bentonite, silica gel, and also the mother liquor byproduct of phosphate fertilizer manufacture, which is rich in silica, or a gel obtainable therefrom.

The reactive tensides in the compositions of the present invention are chemically bound to the components of the soil. Such a bond formation is important for several reasons:

a. Such bond formation affects the structure as well as the air-and water content of the soil. The soil becomes crumbly and the imperviousness of the aggregates significantly increases. Percolation of the water in the deeper layers can be prevented, as well as evaporation of water from, and drying of, the upper layers can be minimized; thus the useful water capacity can be increased. Plant growth and/or yield is increased, especially during periods of decreased precipitation, because the amount of water which is available to the palnts in the soil is larger and remains available for longer periods of time.

b. As a result of the reduction of surface tension the absorption of nutrients by the plants is increased. For example, in the case of maize a 24% increase in nutrient absorption was observed with the aid of alanin labeled with $C^{14}$ isotope.

c. It was surprisingly discovered that the compositions of the present invention when bound to the soil advantageously affect the activity of soil bacteria. After application to the soil bacterial activity increases, sometimes by as much as 20%, and the increased activity lasts for about 6–12 weeks. At the end of 6 months an increased activity of about 10% could still be observed, and thereafter the activity gradually decreases and returns to its original level, but does not increase below that value. Increased bacterial activity affects the development of plants and results in increased growth and/or yield.

d. The reactive tenside ingredients of the compositions of the present invention exert their useful activity upon plant growth only, when they are bound to the components of the soil. It can be assumed that between the compositions of the invention and the soil components an interaction takes place which results in improved plant growth performance. This is because it was discovered that the inventive compositions contribute to improved growth processes only in soil but not when growth is carried out in aqueous solutions away from soil.

The compositions of the presnt invention were found not only to increase crop growth rate and yield, but depending on the particular crop variety, increased protein content, nucleic acid content, improved leafy growth, and Hill-activity have been observed in controlled comparative plant-growth experiments. It was also observed that certain combinations of active ingredients, and of active ingredients with certain fertilizers or other auxiliary materials exhibit synergistic activity, because growth improvement with the combinations is greater than could be obtained with the components separately.

The invention is further illustrated by the following specific examples in which the preparation of certain specific active components of the present compositions, is disclosed.

EXAMPLE 1

A dicyanamide-acetamide condensation product is prepared by introducing 140 liters water into an enameled duplicator and then there are added 1.5 kmol acetaldehyde, 2.6 kmol dicyandiamide, and 2.4 kmol sodium acetate. The temperature is increased to 80°–100°C and is maintained for 20 minutes. Subsequently a further 1.2 kmol acetaldehyde is added to the reaction vessel and the resulting product is cooked for 1 hour. When the viscosity of the reaction mass is about 90–120 cps the reaction is completed. If the viscosity is not reached within the stated time, cooking is continued until the desired viscosity is established. The resulting product has a molecular weight of 8,000 – 9,000 and has the formula

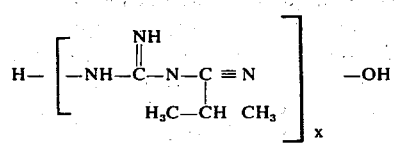

EXAMPLE 2

A guanidine-formaldehyde condensation product is prepared by adding 140 liters of water to an enameled duplicator, then 3.3. kmol formaldehyde, 2.4 kmol sodium acetate, and 3.95 kmol freshly prepared guanidine. The mixture is heated to about 80°C and when the reaction begins the temperature increases to about 100°–102°C. After about 20 minutes at this temperature an additional 1.6 kmol formaldehyde is added to the reaction mass. Cooking is continued for about 1 hour until a viscosity of 100–130 cps is achieved. The end product has an average molecular weight of 4,000 – 5,000 and the formula

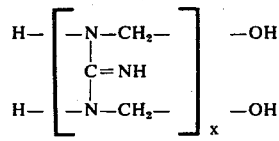

EXAMPLE 3

An ethylenediamine-1,2-dichloroethane condensation product is prepared by introducing into a reactor 2 kmol ethylene diamine in 600 kg toluene and then heating to 70°C. The, while the temperature is carefully maintained, 1.2 kmol dichloroethane is added and 2 kmol ammonia is bubbled into the liquid for about 30–40 minutes. The reaction mass is then heated to about 100°C and held at this temperature for about 15–20 minutes. Finally the toluene is removed under vacuum. The resulting product has the formula

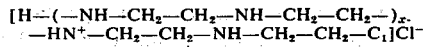

wherein the average value of $x$ is 3.

EXAMPLE 4

A guanidinecondensation product with acetaldehyde which is cross linked to the extent of about 15%, is prepared in the same manner as in Example 2, except instead of formaldehyde here acetaldehyde is employed. The reaction is continued until the viscosity of the reaction mass is 200–250 cps. The molecular weight of the resulting product is 12,000 – 13,000 and is constituted of recurring units of

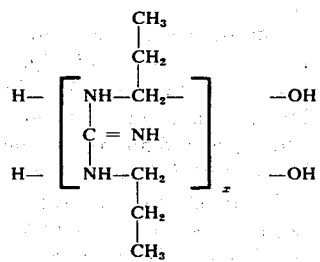

The product is filtered off, dried. It is water soluble. Then the product is employed with a triazine-based plant-protecting agent.

EXAMPLE 5

An imidazole condensate with dichloropropane concentrate is prepared by dissolving 2 kmol dichloropropane in 200 liter water-free ethanol and then, during vigorous agitation, a solution of 2.05 kmol imidazole in 400 liter ethanol is added. The temperature should not exceed about 60°C. After the reaction is completed the chloride bound by the imidazole is driven off with ammonia. The ammonium chloride precipitate is filtered off and then the ethanol is driven off. 70–75% by weight of the following composition is obtained

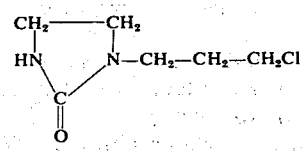

and 25–30% is the following compound

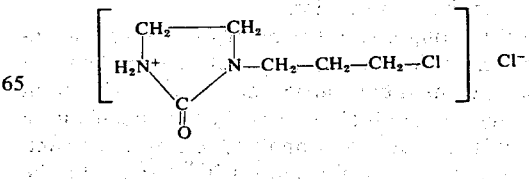

The product is water soluble.

EXAMPLE 6

A 1-aminoethyl-2-lauryl-2-imidazoline derivative is prepared by dissolving 1 kmol of that compound in 200 ml carbon tetrachloride and then 1 kmol propionaldehyde is added, while the temperature is not allowed to exceed 40°C. After stirring at this temperature for about 3 hours the following product, having a molecular weight of 325, is obtained

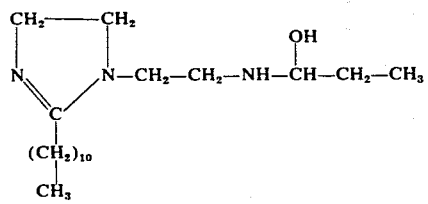

After the reaction is completed, the carbon tetrachloride is driven off with vacuum and the material is applied to dry quartz powder as carrier.

EXAMPLE 7

Guanidine-1,1-dichloroethane condensate is prepared as in Example 3 the ethylenediamine-1,2-dichloroethane condensate was prepared, with the exception that only 1 kmol dichloroethane is reacted. An end product having a molecular weight of 158 and the following formula, are obtained

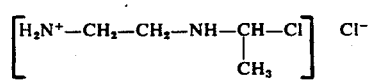

EXAMPLE 8

A diethylenetriamine - 1,2-dichloroethane (1:1 molar ratio) condensate, containing 15% N-lauryl end groups, is prepared. 2 kmol diethylenetriamine and 0.3 kmol dodecylamine are dissolved in 600 kg toluene. The solution is heated to 70°C and while the temperature is carefully maintained, 2 kmol 1,2-dichloroethane is gradually added to the solution, while 5 kmol ammonia is conducted through the reaction vessel. The temperature is then increased to 100°C and the product is allowed to stay at this temperature for 15–20 minutes and thereafter the toluene is driven off under vacuum. The end product is a mixture of the following two components

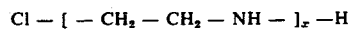

and

wherein $x$ and $y$ are between 4 and 30. The average molecular weight is about 700.

EXAMPLE 9

A diethylene triamine-formaldehyde condensate is prepared one end group of which is bound through an acid amide bond, and the composition also contains a polyacrylamide soil conditioner. The condensate is prepared by mixing 6 kmol diethylenetriamide with 6 kmol butyric acid in a reaction vessel, and then heating under constant stirring to 150°C. The reaction mixture is constantly vented and held at this temperature until the acid number does not go below 10. After cooling to 36°C 11.92 kmol formaldehyde is added the pH of exactly 8.5, during constant stirring. The pH of the reaction mixture is constantly monitored and maintained. The reaction mass is held under constant stirring for 3 hours at 40°C. 80–85% of the resulting product corresponds to the first of the following formulae, and 15–20% to the second, and the average molecular weight is about 225.

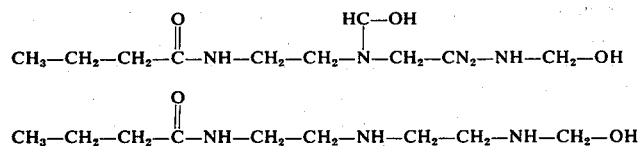

EXAMPLE 10

A modified urea-formaldehyde condensate is prepared by adjusting the pH of 7.7 kmol formaldehyde exactly to 8 and then heating it to 36°C. After increasing the pH to 8.5, the temperature is increased to 40°C. Then 7.7 kmol monoacetylurea is added and the mixture is stirred for 3 hours while N-monomethylol-N'-acetylurea is formed. Before commencement of crystallization 2 kmol diethylenetriamine is added and the reaction is interrupted by cooling.

EXAMPLE 11

An 1-aminoethyl-imidazoline-formaldehyde condensation product is prepared by dissolving 2.55 kmol formaldehyde in 1,000 liter water. The pH of the solution is then adjusted exactly to 8 and the solution is then heated to 36°C. Then 2.5 kmol 1-aminoethyl-2-imidazoline is added and the pH is adjusted to 8.5. The temperature is then increased to 40°C and after 2 hours to 50°C, where the mass is stirred for 30 minutes. The resulting product has a molecular weight of about 143 and the formula

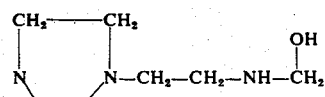

EXAMPLE 12

An N-aminopropyl-laurylamine-acetaldehyde condensation product is prepared by heating 4 kmol aminopropyloleylamine to 40°C and adjusting the pH to 8.5. Then under constant stirring gradually 7.9 kmol propionaldehyde with a pH of 8, is added. The reaction mass is stirred for 4 hours at 40°C. 90% of the product corresponds to the first formula and 10% to the second ethylenediamine is formed. Subsequently the reaction mixture is cooled to 30°C, the chloride is precipitated with ammonia and the precipitate is filtered off. The pH value of the pure solution is adjusted to 8.5 and 2

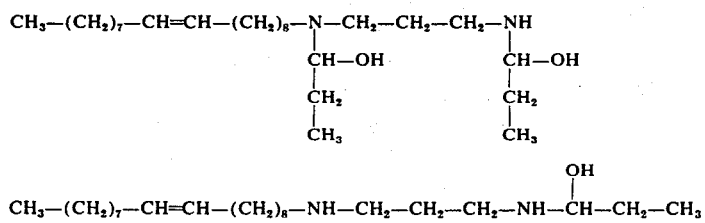

100 kg of this material is worked up with about 500 kg chalk having an average particle size of 6.3 nm and then with 1.5 kg hexaglycol laurylester to keep the solid in suspension. A 5% suspension is prepared and applied at the rate of 100 liters/hectare.

EXAMPLE 13

A urea-guanidine-formaldehyde condensation product is prepared by adjusting the pH of 10 kmol formaldehyde to 8.5 and then adding thereto a solution of 5 kmol urea in 500 l water. The pH is maintained at 8.5 and the temperature at 40°C. The addition of urea lasts for about 1 hour. The reaction mixture is stirres at the same temperature for about 3 more hours and then a solution of 5 kmol guanidine in 500 liters of water, is added. The reaction is constantly sampled and as soon as a precipitate begins to form, the reaction is interrupted by increasing the pH to 10 and cooling the reaction mass to about 5°C. After resting the reaction mixture for 2 days at low temperature the product is sucked off and is determined to have the following formula

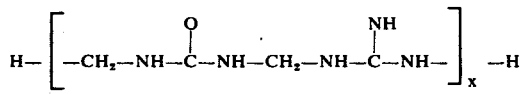

wherein the average value of x is 3.2.

EXAMPLE 14

N-propylol-N'-lauryl ethylenediamine is prepared by dissolving 2 kmol ethylenediamine in 500 liters absolute ethanol and then, while constantly stirring, 2 kmol laurylchloride is added while the temperature is maintained not to exceed 100°C and then the reaction mixture is held for 1.5 hours at that temperature. N'-laurylkmol propionaldehyde ia added. The temperature is maintained at 40°C during a subsequent 3 hour period while stirring. Then the alcohol is driven off under vacuum and the unreacted products are washed out with water. The end product has a molecular weight of about 300 and the formula

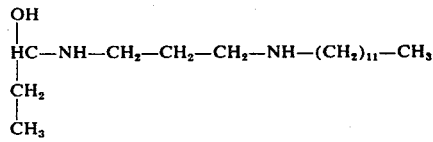

We claim:
1. A process for improving plant yield comprising applying to the soil in which the plant is to be grown an amount effective to improve plant yield of a reactive tenside selected from the group consisting of addition products, having a molecular weight under 15,000, of one or more of (i) guanidine and dicyandiamide, with one or more of (ii) formaldehyde, acetaldehyde, propionaldehyde, and $C_{2-6}$ dihalogenealkanes, acid addition salts of said addition products, and mixtures thereof.

2. A process in accordance with claim 1, wherein the reactive tenside is a compound having the formula

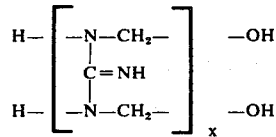

and having an average molecular weight of from 4,000 to 5,000.

* * * * *